US012526208B2

United States Patent
Vasseur et al.

(10) Patent No.: US 12,526,208 B2
(45) Date of Patent: Jan. 13, 2026

(54) LLM-BASED AGENT AS A BACK-OFFICE VIRTUAL NETWORK TROUBLESHOOTING ASSISTANT

(71) Applicant: Cisco Technology, Inc., San Jose, CA (US)

(72) Inventors: Jean-Philippe Vasseur, Combloux (FR); Eduard Schornig, Haarlem (NL); Pierre-André Savalle, Rueil-Malmaison (FR); Grégory Mermoud, Venthône (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/386,900

(22) Filed: Nov. 3, 2023

(65) Prior Publication Data

US 2025/0150364 A1    May 8, 2025

(51) Int. Cl.
*G06F 40/284*        (2020.01)
*H04L 41/5054*       (2022.01)
*H04L 41/5074*       (2022.01)

(52) U.S. Cl.
CPC ........ *H04L 41/5054* (2013.01); *G06F 40/284* (2020.01); *H04L 41/5074* (2013.01)

(58) Field of Classification Search
CPC .............. H04L 41/5054; H04L 41/5074; G06F 40/284
See application file for complete search history.

(56) References Cited

U.S. PATENT DOCUMENTS

| 2008/0195614 | A1* | 8/2008 | Lutz ..................... H04L 41/0654 709/224 |
| 2018/0150555 | A1* | 5/2018 | Karuppasamy ........ G06Q 10/20 |
| 2020/0366548 | A1 | 11/2020 | Deb et al. |
| 2020/0396144 | A1* | 12/2020 | Clarke ................ H04L 41/5074 |
| 2022/0376994 | A1* | 11/2022 | Mishra .................... G06N 3/096 |
| 2023/0237275 | A1 | 7/2023 | Wang et al. |
| 2023/0259705 | A1 | 8/2023 | Tunstall-Pedoe et al. |
| 2023/0259821 | A1 | 8/2023 | Travalini et al. |

OTHER PUBLICATIONS

Liu Z., et al., "Dynamic LLM-Agent Network: An LLM-Agent Collaboration Framework with Agent Team Optimization", Department of Computer Science Technology, arXiv:2310.02170v1 [cs.CL], Oct. 3, 2023, pp. 1-21.
Wu Q., et al., "AutoGen: Enabling Next-Gen LLM Applications via Multi-Agent Conversation", arXiv:2308.08155v2 [cs.AI] Oct. 3, 2023, pp. 1-43.

* cited by examiner

*Primary Examiner* — Soe Hlaing
(74) *Attorney, Agent, or Firm* — Lee & Hayes, P.C.

(57) ABSTRACT

In one implementation, a device performs, using a using a large language model-based troubleshooting agent, troubleshooting of a plurality of issues in a network indicated by a plurality of support tickets opened by users of the network. The device aggregates, based on results of the troubleshooting, the plurality of support tickets into a master support ticket. The device obtains a resolution to the master support ticket from a support engineer. The device uses the resolution to the master support ticket in conjunction with the large language model-based troubleshooting agent to troubleshoot a new support ticket.

20 Claims, 9 Drawing Sheets

LLM-BASED AGENT AS A BACK-OFFICE VIRTUAL NETWORK TROUBLESHOOTING ASSISTANT

TECHNICAL FIELD

The present disclosure relates generally to a large language model (LLM)-based agent as a virtual network troubleshooting assistant.

BACKGROUND

Traditionally, network troubleshooting in many organizations is structured into multiple tiers (L1, L2, L3) based on the level of expertise and experience of support engineers, with each tier handling increasingly complex issues. When a new support ticket is initiated, it typically follows a tiered process. Initially, the ticket is assigned to an L1 support engineer who conducts basic checks and gathers initial information. If no obvious problem is identified, the ticket is then escalated to an L2 support engineer who collects more detailed data and conducts in-depth troubleshooting. Similarly, if the L2 support engineer is unable to identify the root cause and resolve the issue, it may be further escalated to a higher-level support group.

The troubleshooting process can be time-consuming, as the issue is transferred between different layers of the support organization, or even different specialized domain experts or teams. This is especially true for complex issues where identifying the root cause is challenging and may require traversing all support tiers. Another drawback of this typical approach is that it can result in wasted time and resources, as multiple engineers may concurrently investigate the same issue or set of related issues.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

Figure 1A:
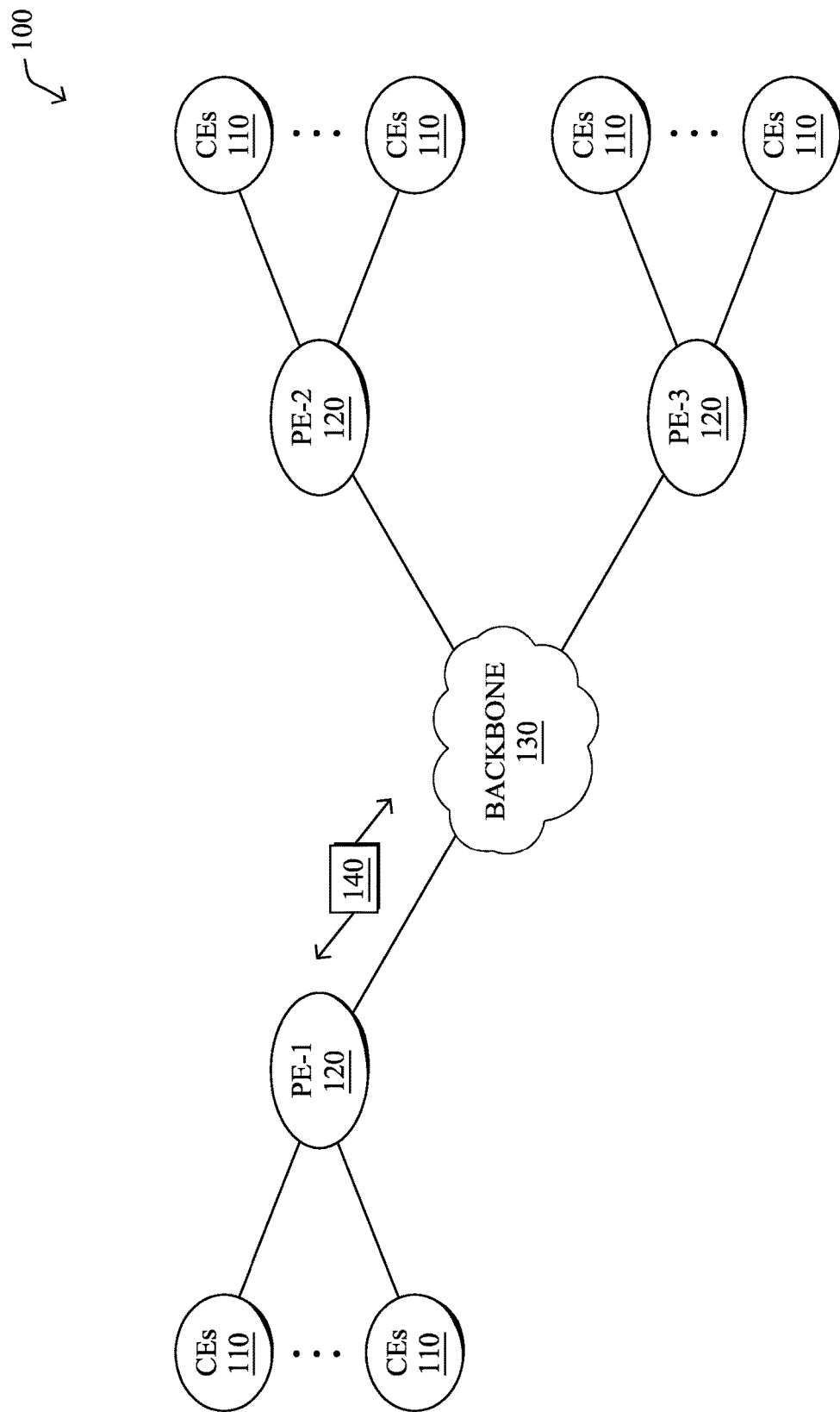
FIGS. 1A-1B illustrate an example communication network.

According to one or more implementations of the disclosure, a device performs, using a using a large language model-based troubleshooting agent, troubleshooting of a plurality of issues in a network indicated by a plurality of support tickets opened by users of the network. The device aggregates, based on results of the troubleshooting, the plurality of support tickets into a master support ticket. The device obtains a resolution to the master support ticket from a support engineer. The device uses the resolution to the master support ticket in conjunction with the large language model-based troubleshooting agent to troubleshoot a new support ticket.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
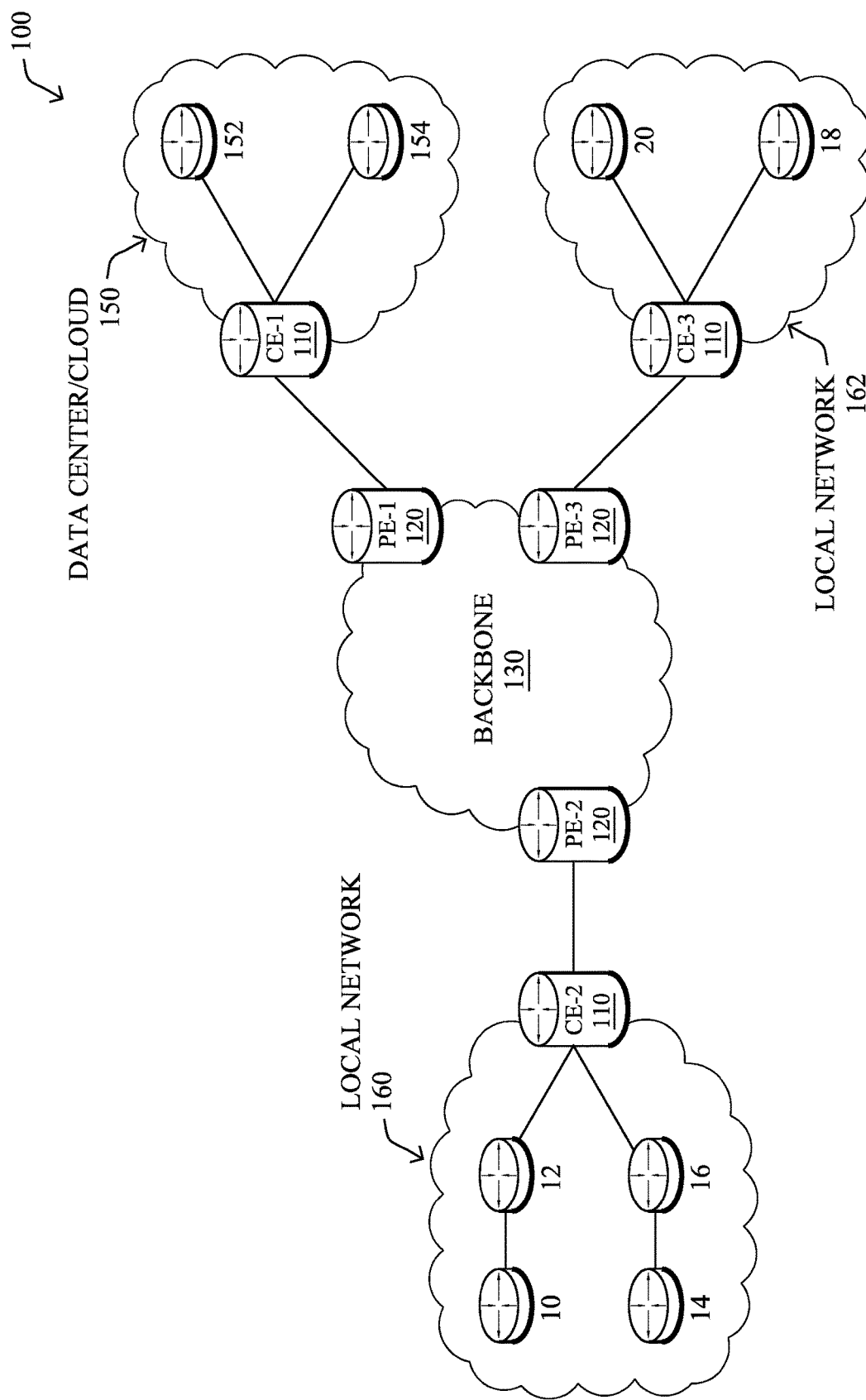

FIG. 1B illustrates an example of network 100 in greater detail, according to various implementations. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
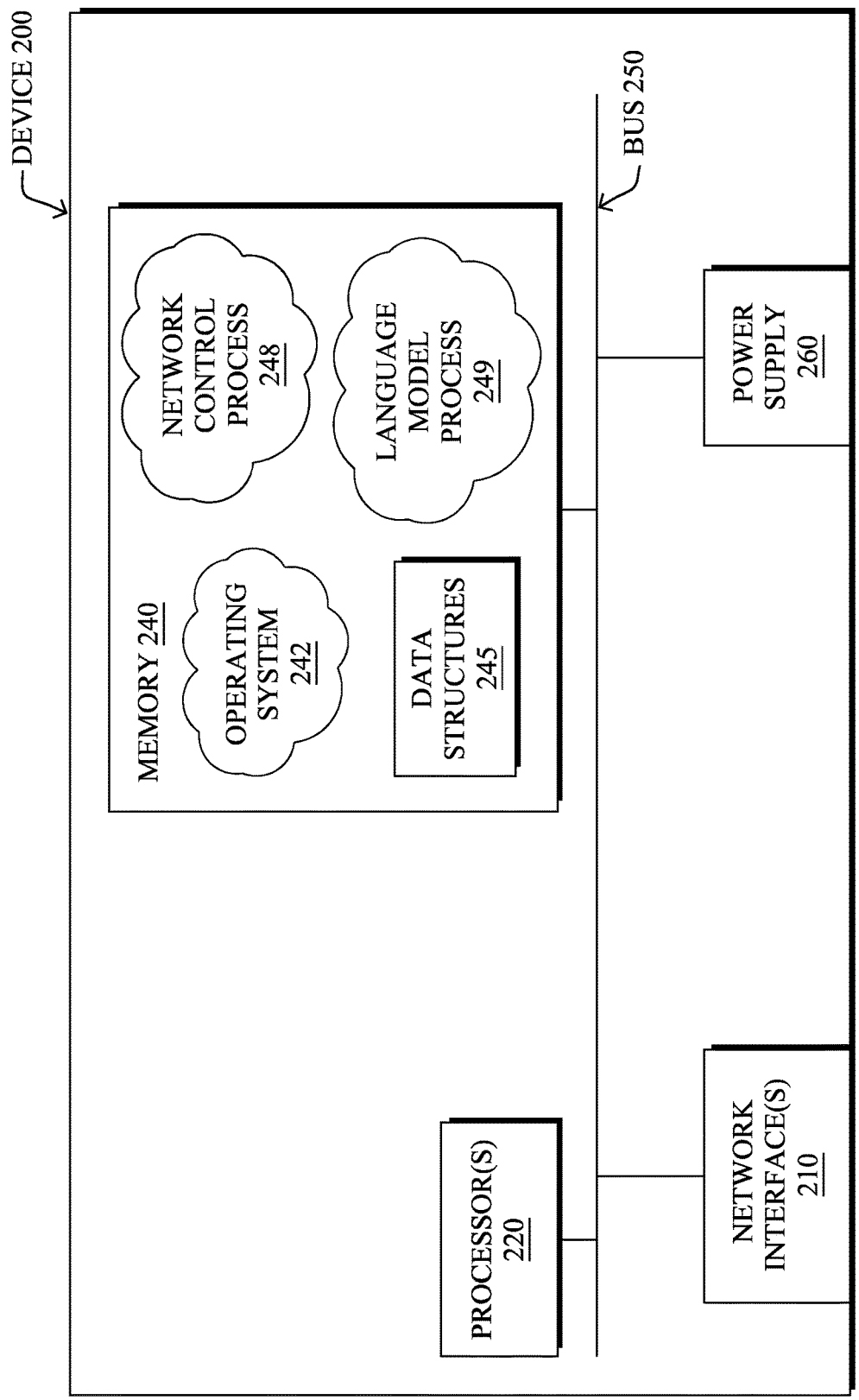
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software components may comprise a network control process 248 and/or a language model process 249 as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In some instances, network control process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, network control process 248 may consist solely of providing mechanisms necessary for source routing techniques. That is, for source routing, other devices in the network can tell the less capable devices exactly where to send the packets, and the less capable devices simply forward the packets as directed.

In various implementations, as detailed further below, network control process 248 and/or language model process 249 may include computer executable instructions that, when executed by processor(s) 220, cause device 200 to perform the techniques described herein. To do so, in some implementations, network control process 248 and/or language model process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, network control process 248 and/or language model process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that network control process 248 and/or language model process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, network control process 248 and/or language model process 249 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, network control process 248 may use a generative model to generate synthetic network traffic based on existing user traffic to test how the network reacts. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
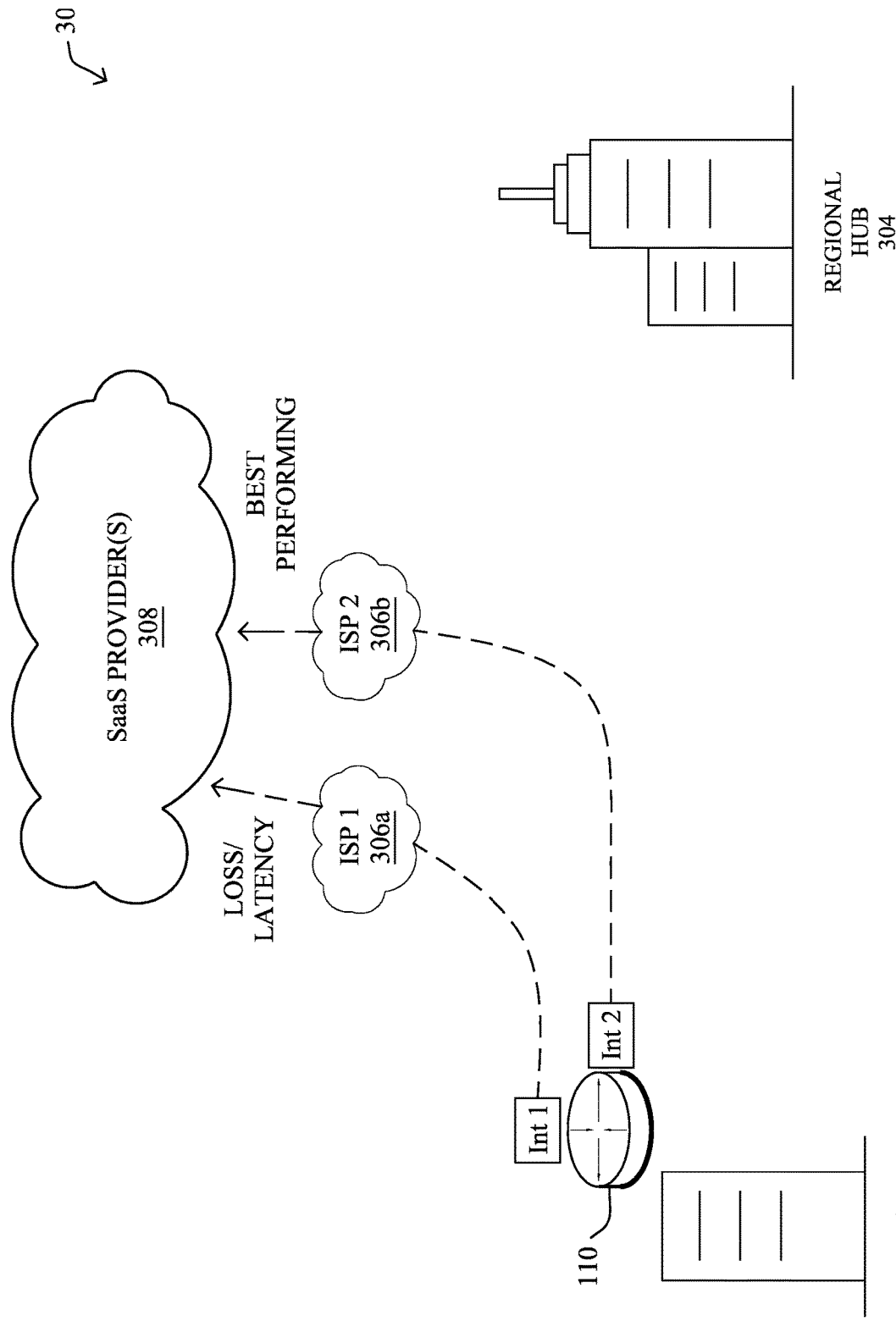
FIGS. 3A-3B illustrate example network deployments.
Figure 3B:
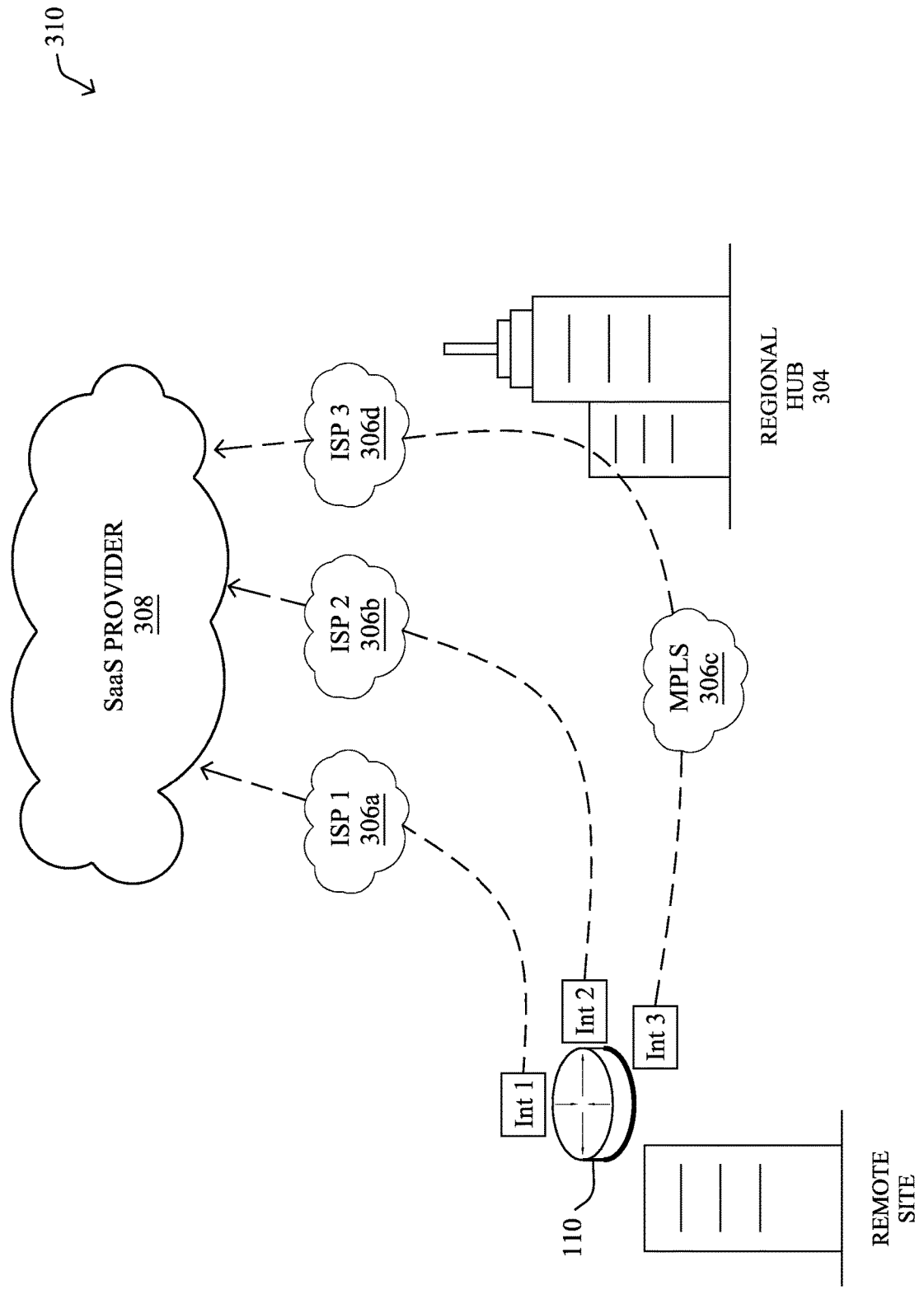

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4:
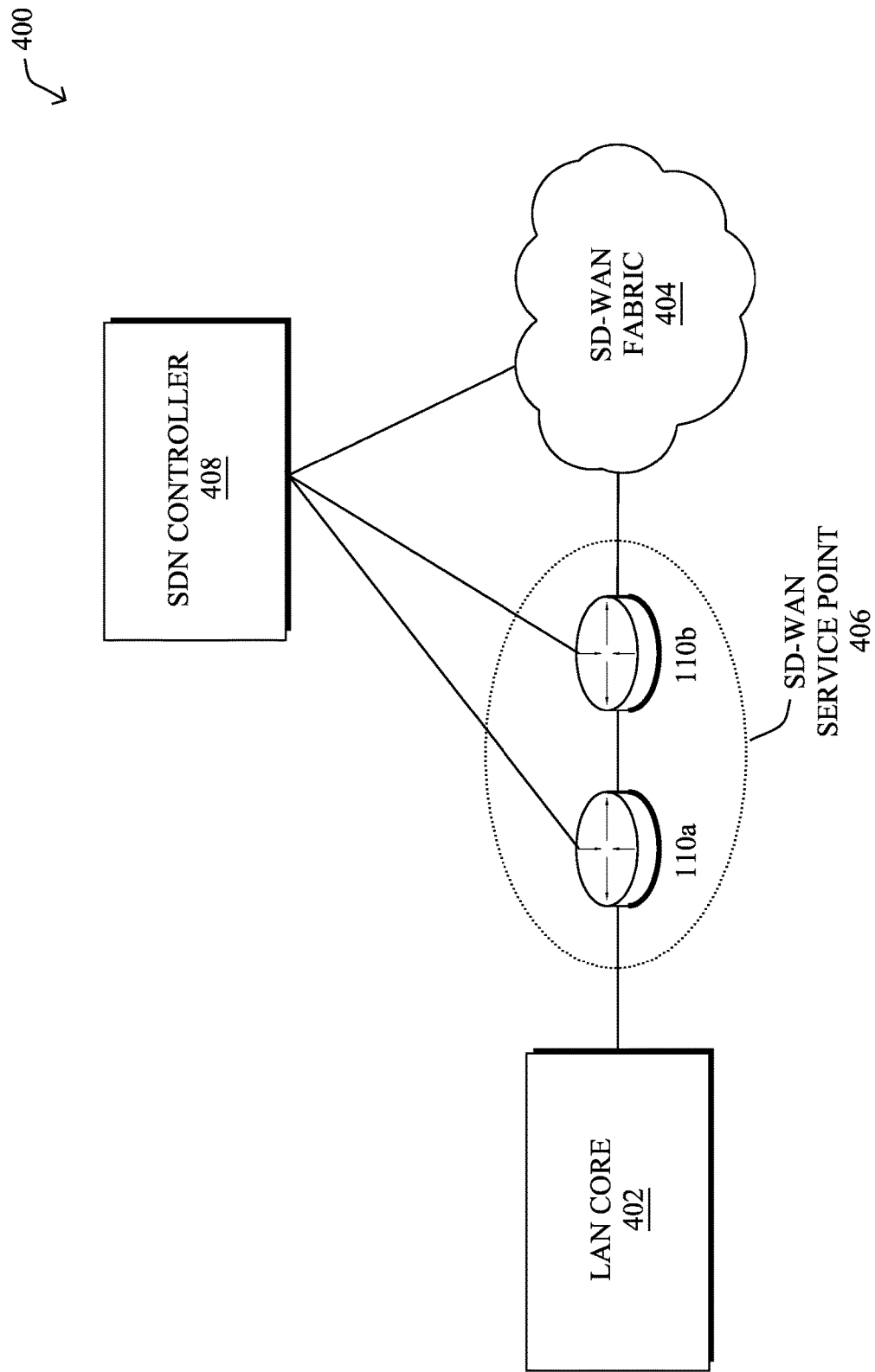
FIG. 4 illustrates an example software defined network (SDN) implementation.

FIG. 4 illustrates an example SDN implementation 400, according to various implementations. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance. SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service (e.g., through execution of network control process 248), typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet. bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various implementations, SDN controller 408 may employ application aware routing, which refers to the ability to route traffic so as to satisfy the requirements of the application, as opposed to exclusively relying on the (constrained) shortest path to reach a destination IP address. For instance, SDN controller 408 may make use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, SDN controller 408 may compute a variety of models to understand application requirements, and predictably route traffic over private networks and/or the Internet, thus optimizing the application experience while drastically reducing SLA failures and downtimes.

In other words, SDN controller 408 may first predict SLA violations in the network that could affect the QoE of an application (e.g., due to spikes of packet loss or delay, sudden decreases in bandwidth, etc.). In other words, SDN controller 408 may use SLA violations as a proxy for actual QoE information (e.g., ratings by users of an online application regarding their perception of the application), unless such QoE information is available from the provider of the online application. In turn, SDN controller 408 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one implementation. In general, routing configuration changes are also referred to herein as routing "patches," which are typically temporary in nature (e.g., active for a specified period of time) and may also be application-specific (e.g., for traffic of one or more specified applications).

As noted above, the recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc.

In the specific context of computer networks, though, network troubleshooting and monitoring are traditionally complex tasks that rely on engineers analyzing telemetry data, configurations, logs, and events across a diverse array of network devices encompassing access points, firewalls, routers, and switches managed by various types of network controllers (e.g., SD-WAN, DNAC, ACI, etc.). Moreover, network issues can manifest in various forms, stemming from a multitude of factors, each with its own level of complexity.

The introduction of plugins is a major development that enables LLM-based agents to interact with external systems and empower new domain-specific use cases. In the context of communication networks, the utilization of plugins allows LLMs to engage with documentation repositories, tap into knowledge bases, and interface with live network controllers and devices potentially opening the path to LLMs undertaking more complex tasks such as on-demand troubleshooting, device configuration, and performance monitoring. In addition, agents can be written to perform complex tasks by chaining multiple calls to one or more LLMs. For example, a first step can consist in formulating a plan in natural language, and subsequent steps in executing on this plan by writing code to call application programming interfaces (APIs) or libraries.

One area where LLM-based agents can offer substantial benefits is in the context of technical support for organizations. Traditionally, network troubleshooting in many organizations is structured into multiple tiers (L1, L2, L3) based on the level of expertise and experience of support engineers, with each tier handling increasingly complex issues. When a new support ticket is initiated, it typically follows a tiered process. Initially, the ticket is assigned to an L1 support engineer who conducts basic checks and gathers initial information. If no obvious problem is identified, the ticket is then escalated to an L2 support engineer who collects more detailed data and conducts in-depth troubleshooting.

During the troubleshooting process, the engineer may also refer to past tickets to review the root causes and troubleshooting steps taken for similar issues. While modern ticketing systems can automatically identify related problems and reference them in the new ticket, it remains the responsibility of the support engineer to examine each issue and perform the necessary troubleshooting steps to determine whether the same root cause applies or if the problem is entirely new. If the L2 support engineer is unable to identify the root cause and resolve the issue, it may be further escalated to a higher-level support group.

This entire troubleshooting process can be time-consuming as the issue is transferred between different layers of the support organization, or even different specialized domain experts or teams. This is especially true for complex issues where identifying the root cause is challenging and may require traversing all support tiers. Another drawback of this typical approach is that it can result in wasted time and resources, as multiple engineers may concurrently investigate the same issue. For instance, in the case of network congestion at a large site, multiple users from that site may open support tickets in quick succession. Each ticket may be assigned to a different L1 support engineer, who then independently performs initial debugging tasks before potentially escalating the issue to a higher-level support team. In some cases, the L2 team may eventually recognize the similarity between the new tickets and analyze the collected information to identify common elements (such as the same site, equipment, WAN circuit, etc.), which can significantly narrow down the scope of the investigation. In other cases, these similarities may not be immediately apparent, leading to multiple L2 engineers investigating the same issue, simultaneously.

—LLM-Based Agent as a Virtual Network Troubleshooting Assistant—

The techniques herein introduce a system for integrating an LLM-based network troubleshooting agent and corresponding engine into the workflow of technical support organizations (e.g., technical customer support, technical assistance center, network operations center) with the objective of performing back-office support operations such as troubleshooting, route cause identification, and data gathering and leads to a significant speed-up of the resolution of support tickets related to networking issues.

Illustratively, the techniques described herein may be performed by hardware, software, and/or firmware, such as in accordance with language model process 249, which may include computer executable instructions executed by the processor 220 (or independent processor of interfaces 210) to perform functions relating to the techniques described herein, such as in conjunction with network control process 248.

Specifically, according to various implementations, a device performs, using a using a large language model-based troubleshooting agent, troubleshooting of a plurality of issues in a network indicated by a plurality of support tickets opened by users of the network. The device aggregates, based on results of the troubleshooting, the plurality of support tickets into a master support ticket. The device obtains a resolution to the master support ticket from a support engineer. The device uses the resolution to the master support ticket in conjunction with the large language model-based troubleshooting agent to troubleshoot a new support ticket.

Operationally, upon receiving a new ticket, the system introduced herein automatically generates step-by-step troubleshooting instructions by analyzing past similar issues and executes them in the network environment. This is achieved by leveraging plugins that allow troubleshooting agent 502 to fetch data via API integrations with network controllers (e.g., DNAC, ACI, SD-WAN) and/or monitoring systems (e.g., Network Management Systems). The primary goals are to either directly identify the root cause of the problem or, when direct identification is not feasible, gather pertinent information such as logs, network context, and performance statistics to facilitate the work of human support engineers. Finally, the system can categorize similar tickets based on common elements, such as site location, WAN gateway, circuit, or log patterns, or based on identified root causes. These groups of tickets are then consolidated into a master issue and escalated to the appropriate technical contacts for remediation.

Figure 5:
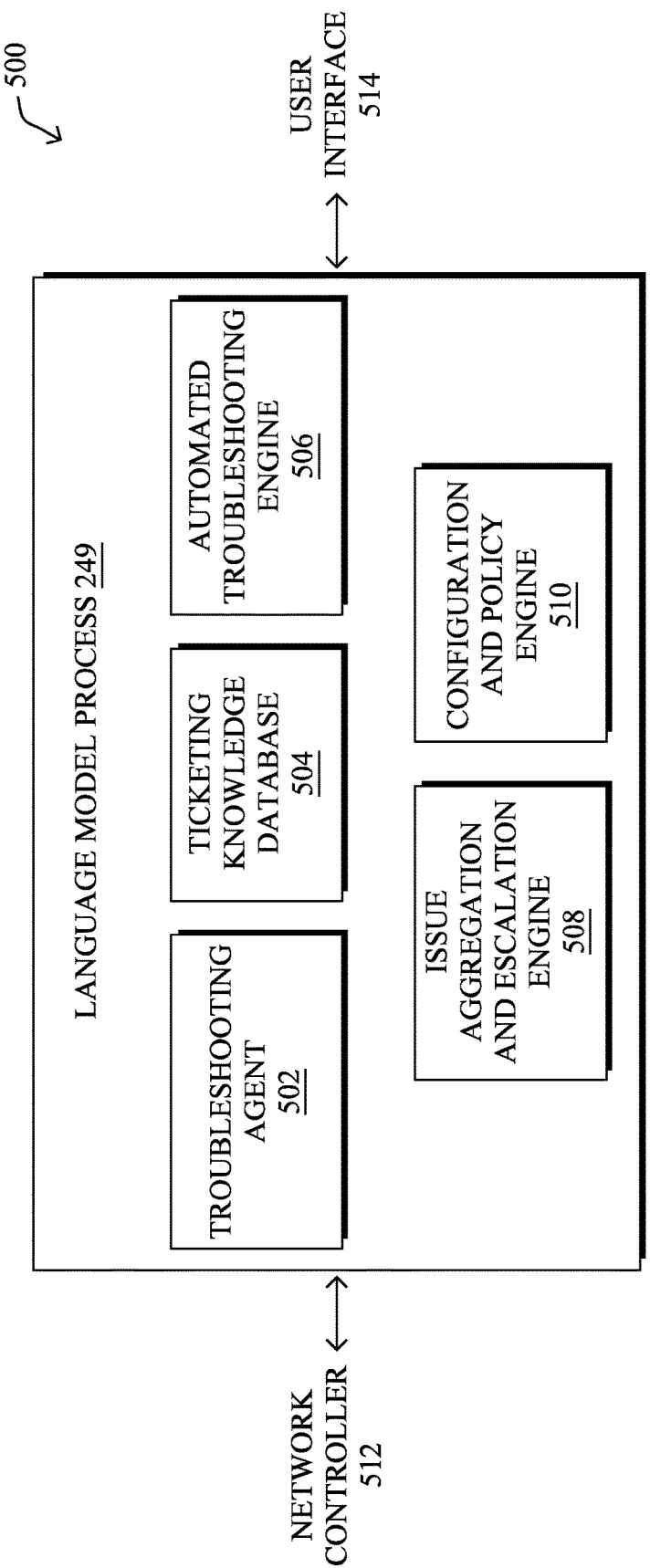
FIG. 5 illustrates an example architecture for a large language model (LLM)-based agent as a virtual network troubleshooting assistant.

FIG. 5 illustrates an example architecture for a large language model (LLM)-based agent as a virtual network troubleshooting assistant, according to various implementations. At the core of architecture 500 is language model process 249, which may be executed by a controller for a network or another device in communication therewith. For instance, language model process 249 may be executed by a controller for a network (e.g., SDN controller 408 in FIG. 4, a network controller in a different type of network, etc.), a particular networking device in the network (e.g., a router, a firewall, etc.), another device or service in communication therewith, or the like. For instance, as shown, language model process 249 may interface with a network controller 512, either locally or via a network, such as via one or more application programming interfaces (APIs), etc. In addition, language model process 249 may communicate with any number of user interfaces, such as user interface 514.

Figure 6:
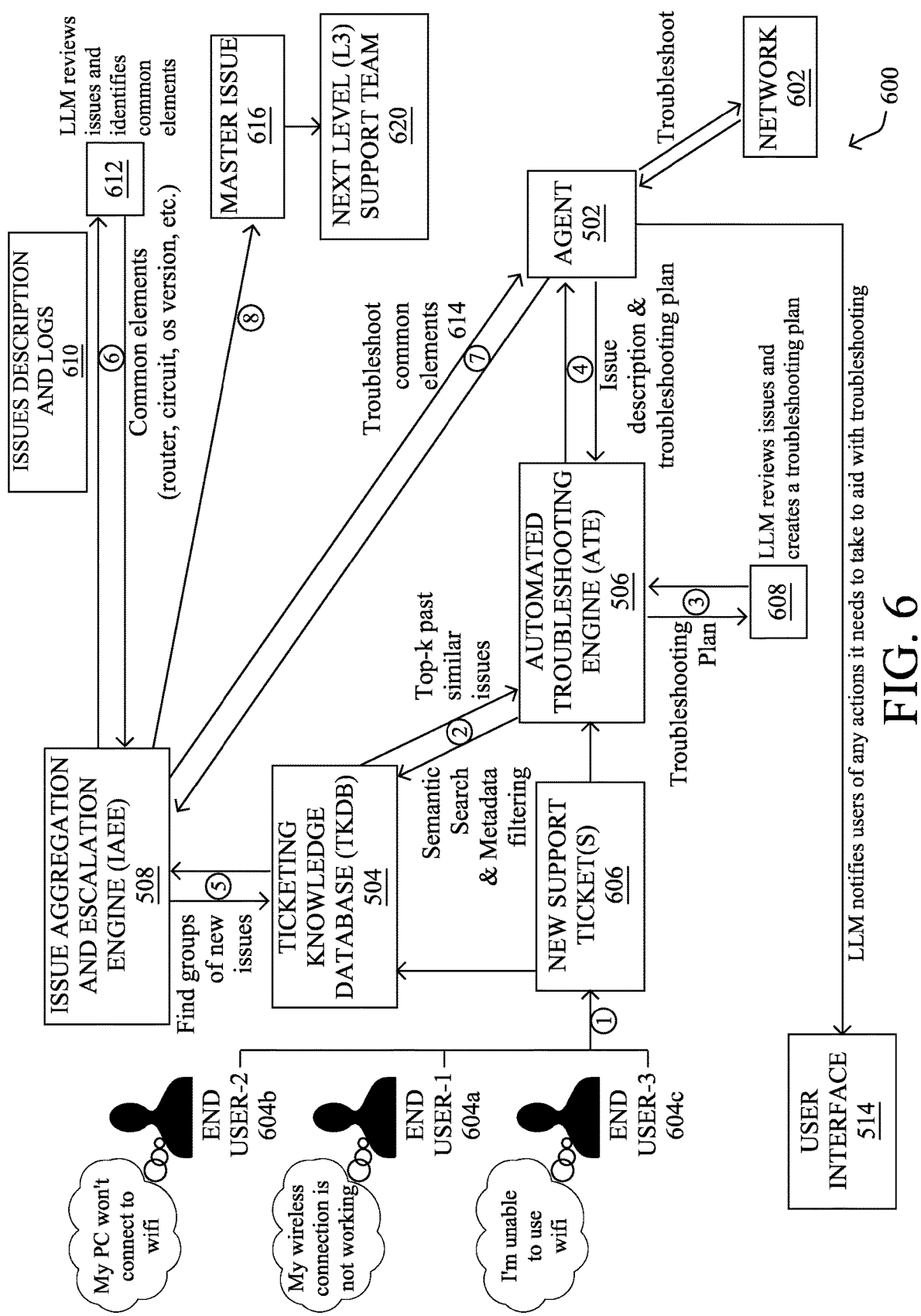
FIG. 6 illustrates an example of the interactions of the components of the architecture in FIG. 5.

As shown, language model process 249 may include any or all of the following components: a troubleshooting agent 502, a ticketing knowledge database 504, an automated troubleshooting engine 506, an issue aggregation and escalation engine 508, and/or a configuration and policy engine 510. As would be appreciated, the functionalities of these components may be combined or omitted, as desired. In addition, these components may be implemented on a singular device or in a distributed manner, in which case the combination of executing devices can be viewed as their own singular device for purposes of executing language model process 249. FIG. 6 illustrates an example 600 of the interactions of the components of architecture 500.

According to various implementations, troubleshooting agent 502 may leverage one or more LLMs to troubleshoot an issue, find the actual root cause for the issue, and/or suggest a set of one or more actions to fix the issue. Let ai denote an action used for troubleshooting an issue I and let Ai denote an action (configuration change) on the network (closed-loop control). In various instances, issue I may be raised by an end user, a set of users, or detected automatically within the network.

The set of actions Ai required to solve the issue I may be determined on-the-fly by the LLM of troubleshooting agent 502, statically determined according to a cookbook for each trajectory made of a set of action ai, or the like. For example, a static cookbook may be used to map a specific ak to set of actions Ak,l. Consider the action ak="Check the priority queue length of a router," a static set of action ak,l may be used to trigger a set of 1 action on the network (e.g., "Change the weight of the priority queue," "Modify the WRED parameter for the high priority queue"). In another implementation, the system may discover the set of required actions related to a given root cause identified thanks to a set of action ai, using reinforcement learning or another suitable approach.

If the root cause identified by troubleshooting agent 502 for issue I is eligible for automated action (e.g., according to a policy), troubleshooting agent 502 may perform any or all of the following:

Troubleshooting agent 502 retrieves the set of action Ai for the root cause of issue I after activating a timer T (max time to solve the issue)

Troubleshooting agent 502 may also employ various optimization criterion may be used for solving a given task T. For instance, troubleshooting agent 502 may solve some tasks with objective metrics such as reducing the processing time or improve accuracy even at the risk of involving more steps and tokens (cost). In the context of the techniques herein, the issue criticality may also drive the optimization criteria (e.g., time versus reliability versus cost). In one implementation, the optimization criteria may be unique and decided according to policy and criticality. In another implementation, troubleshooting agent 502 may trigger multiple actions in parallel, each with different optimization criterion. For example, for a given issue I, troubleshooting agent 502 may send a request to a first LLM with a first criteria (e.g., solve as quickly as possible, optimizing time) and send the same request to a second LLM with different optimization criteria (e.g., efficiency). In such a case, troubleshooting agent 502 may use the reply to the first request (set of resolution action Ai) to quickly fix the network, followed by using the second set of actions to optimize the resolution of the issue. Note that both requests may not overlap in terms of closed-loop actions, as well.

As would be appreciated, while troubleshooting agent 502 may be capable of performing complex troubleshooting tasks and, in some instances, taking automated action to correct issues in the network, its general functionality may also include tasks such as simply monitoring the status or performance of the network, as well as performing configuration changes, even in the absence of an existing issue.

In other words, during execution, troubleshooting agent 502 may take questions as input, runs one or more steps that can consist in calling an LLM, or retrieve data from external systems such as network controllers and monitoring systems, and produces an answer as output. To do so, troubleshooting agent 502 may rely on external APIs to obtain data required to perform troubleshooting and monitoring actions.

In various implementations ticketing knowledge database 504 may take the form of a vector database or other database that has the role of storing the text contents of support tickets as vector embeddings and facilitating semantic searches of said ticket history. For instance, ticketing knowledge database 504 may leverage a vector database such as Chroma or Pinecone to achieve this role and leverage either SaaS based embedding services such as OpenAI or local open-source embedding models to vectorize the ticket contents. Besides the vector embeddings, for each ticket, ticketing knowledge database 504 may also store additional information as metadata, such as any or all of the following:

State: Unassigned, Open, Closed (Resolved)
Issue category: Poor connectivity, No connectivity etc.
Technology domain: Security, Wired Access, Wireless Access, etc.
End user satisfaction: A reflection of how satisfied the user was with the support interaction usually as a 1 (low) to 5 (high) score.
Ticket key performance indicators (KPIs): Metrics such as time to resolution, that measure the total time taken to resolve the tickets or any other KPIs relevant for the specific support organization.

In various implementations, automated troubleshooting engine 506 may perform several tasks, when it receives a new support ticket:

In a first step, it queries ticketing knowledge database 504 for similar issues using a combination of semantic search and metadata filters. Automated troubleshooting engine 506 may identify relevant past issues based on a certain threshold of similarity, however it may use additional criteria such as user satisfaction score to narrow down the scope.

In a second phase, automated troubleshooting engine 506 may sends the ticket contents to an LLM (e.g., the LLM of troubleshooting agent 502) specifically tasked with extracting the troubleshooting steps performed in each of the identified similar tickets and compose a step-by-step troubleshooting plan. Based on the available LLM context size, this operation may be performed as one step, with all past tickets being included in the same LLM prompt or using multiple steps. In this second instance, troubleshooting steps for each ticket are extracted separately followed by a second query to the LLM which is asked to combine all the steps in a troubleshooting plan.

The resulting troubleshooting plan may resemble an inverted tree structure, with common steps that are executed universally at the top, such as identifying the site to which the user is connected, determining the connection type, and assessing the overall health status. These initial steps then branch out into several trajectories, each corresponding to potential root causes or specific troubleshooting paths. For example, these branches might involve verifying the health of the Wireless Access Point (AP), checking the uptime of the upstream switch, or assessing the load on the WAN connection, among other possibilities.

Furthermore, within each branch of the troubleshooting tree, there may exist two distinct types of steps:

1. Autonomous steps: these are sets of troubleshooting steps or actions that troubleshooting agent 502 can execute directly without requiring user intervention.
2. User Steps: these steps are actions that are part of the troubleshooting plan which need to be carried out by the end-users themselves. These actions might include actions like rebooting a host device or software client, modifying local configuration parameters, or collecting specific logs or information.

Next, automated troubleshooting engine 506 may send the troubleshooting plan to troubleshooting agent 502 that can interact with network controllers and monitoring systems to execute it and identify the root cause of the issue. To reduce the burden on the end user, troubleshooting agent 502 may be directed to initially explore the branches within the troubleshooting plan that exclusively consist of autonomous steps. This approach aims to identify the root cause without requiring any direct involvement from the end user. If, however, no root cause can be determined following the exploration of these autonomous branches, troubleshooting agent 502 may proceed to investigate branches that necessitate user interaction.

In such cases where user interaction is required, troubleshooting agent 502 may engage a user-facing LLM with the purpose of communicating with the end user. For instance, it may request that the end user perform certain actions, provide additional clarifications, or submit logs, thereby facilitating the troubleshooting process.

Upon completion of all the troubleshooting steps, two potential outcomes are possible:

Successful root cause identification: troubleshooting agent 502 successfully identifies the root cause of the issue. Automated troubleshooting engine 506 may engage with a system that aims to leverage automated self-healing capabilities to rectify the issue without human intervention. Alternatively, the root cause may be documented in the ticket and forwarded to a human support agent for remediation.

No root cause is identified: the second potential scenario arises when troubleshooting agent 502 is unable to successfully identify the root cause. In one embodiment, automated troubleshooting engine 506 handles this situation by initiating the entire process again, starting with a new query to the ticketing knowledge database 504 for a new set of similar issues. Additional filters may be specified to refine the search, excluding issues that match root causes (RCAs) that have already been ruled out. This process can be iterated multiple times, continuing until either a root cause is either discovered, or a predefined maximum number of attempts is reached. Alternatively, in a second embodiment, automated Automated troubleshooting engine 506 may opt to utilize a system that facilitates the request for assistance from a human Subject Matter Expert (SME) when automated troubleshooting proves inconclusive.

In various implementations, issue aggregation and escalation engine 508 assumes the responsibility of continuously monitoring ticketing queues for the discovery of similar issues. Its primary function is to automatically aggregate similar issues into master tickets that can be quickly escalated to higher-level support teams.

Issue aggregation and escalation engine 508 may routinely query ticketing knowledge database 504 for tickets that are in an open state and employs clustering techniques, such as K-means clustering or Hierarchical Clustering, to group similar tickets together. These clusters represent sets of tickets that share common characteristics or problem descriptions.

When a new cluster of issues is identified, issue aggregation and escalation engine 508 may use an LLM to analyze the network information already collected with the tasks of identifying common network elements, such as a shared site, device, or circuit. For example, it may discover that all users reporting wireless issues are connected to the same site and wireless access point (AP). Additionally, it can identify common user environment elements, such as software versions, device types, or specific application issues. For instance, it might find that users with a particular device type are experiencing connectivity problems with the wireless network. In yet another instance, issue aggregation and escalation engine 508 may identify a combination of both network and user common elements such as all users with a specific software version have issues authenticating when using APs connected to a certain wireless controller (WLC).

If no root cause was pinpointed during earlier troubleshooting stages (e.g., by automated troubleshooting engine 506), issue aggregation and escalation engine 508 may employ troubleshooting agent 502 once again, this time the focus is on performing more targeted troubleshooting of the common elements identified. For instance, it may investigate the health of a specific router, or a network interface associated with the common issues.

Finally, issue aggregation and escalation engine 508 may document its findings, including the common elements it identified and any additional troubleshooting results, into a master ticket. This master ticket is then escalated to the next level of support teams for resolution. Moreover, as new support tickets matching the same master issue are generated, they are automatically cross-referenced to streamline the resolution process. New support tickets matching the same master issue are automatically referenced as they come in.

The fourth component of the solution is configuration and policy engine 510 which allows a support organization administrator to configure a set of constraints on the Virtual Assistant operations. To this end, several constraints can be configured, such as any or all of the following:

Issues of interest: which support queues and categories of issues for which the system should be engaged. For example, the agent may be asked to engage for wireless campus issues but not data center related ones.

Budged: what is the maximum token number (or cost) the agent can spend to perform the automated troubleshooting?

Past issue count-count of past issues to be used for deriving the troubleshooting plan by automated troubleshooting engine 506.

Escalation cluster size: the minimum number of similar issues that issue aggregation and escalation engine 508 needs to identify before opening a master issue and escalating to the next level of support.

FIG. 6 illustrates an example 600 of the interactions of the components of the architecture in FIG. 5. As shown, assume that there are various end users in a network 602, such as end user 604a, end user 604b, and end user 604c. First, one or more of these users may open one or more new support tickets 606, such as via a user interface 514, which is sent to automated troubleshooting engine 506, as shown at (1).

In turn, automated troubleshooting engine 506 may perform a semantic search (and metadata filtering) of ticketing knowledge database 504 for the one or more new support tickets 606, as shown at (2). Then, automated troubleshooting engine 506 may leverage an LLM 608 to devise a troubleshooting plan, based on the k-number of past similar issues to those raised in the one or more new support tickets 606, as shown at (3).

Automated troubleshooting engine 506 then sends the issue description and troubleshooting plan to troubleshooting agent 502, which uses this information to perform troubleshooting in network 602 and returns the identified root causes (RCAs) back to automated troubleshooting engine 506, at (4). Troubleshooting agent 502 or automated troubleshooting engine 506 may then formulate a notification of any actions that users 604 need to take to resolve the issue.

In cases when ticketing knowledge database 504 finds a group of new issues, at (5), it may notify issue aggregation and escalation engine 508. In turn, issue aggregation and escalation engine 508 may leverage an LLM 612 (e.g., the LLM of agent 502) to identify common elements (e.g., router, circuit, SO version, etc.) among the issue descriptions and logs 610, at (6). Issue aggregation and escalation engine 508 may then send ask troubleshooting agent 502 to troubleshoot the common elements 614, at (7). In addition, issue aggregation and escalation engine 508 may also aggregate tickets into a master issue 616 by seeking review from an L3 support team 620, at (8).

Figure 7:
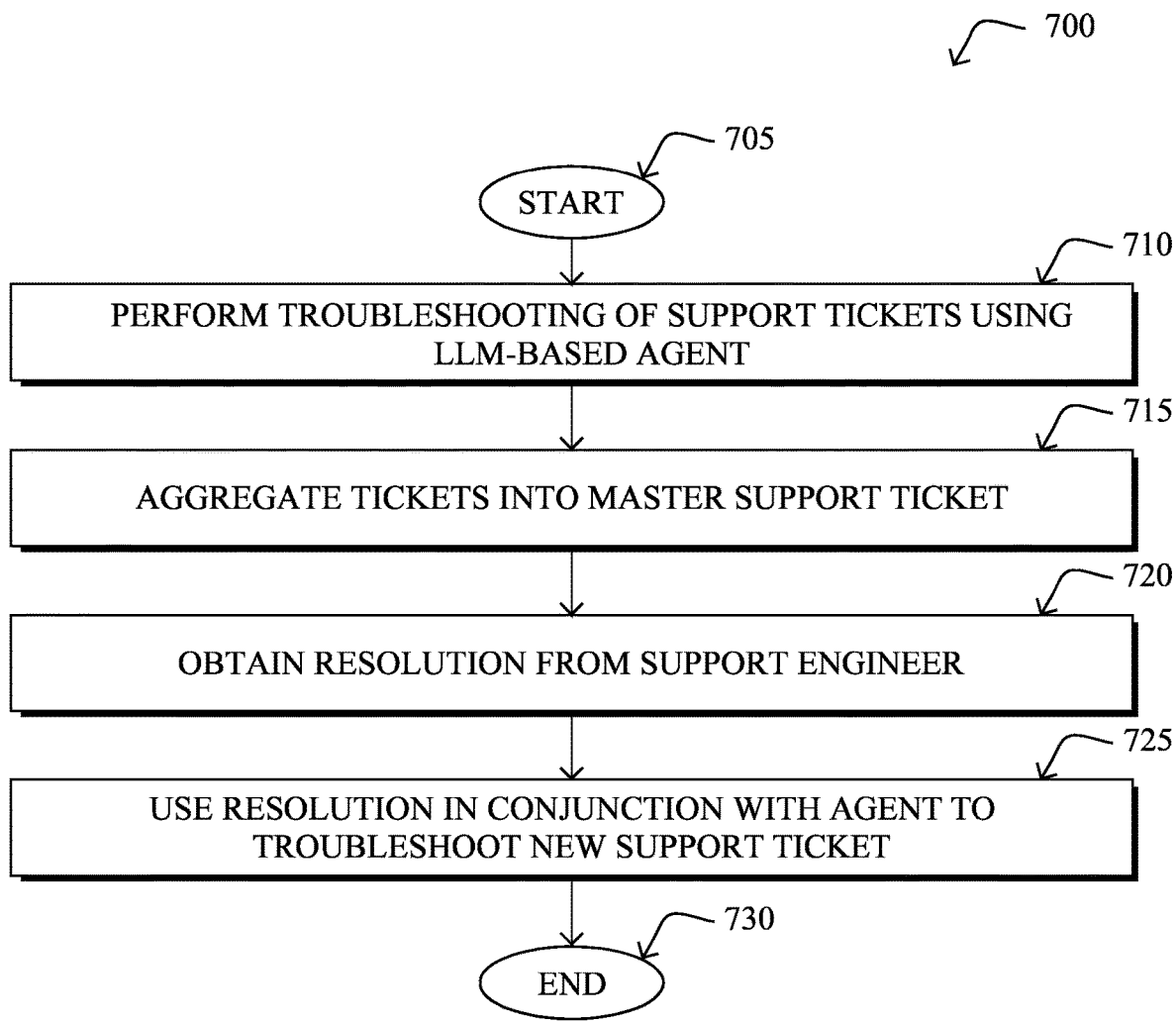
FIG. 7 illustrates an example simplified procedure for using an LLM-based agent as a virtual network troubleshooting assistant.

FIG. 7 illustrates an example simplified procedure (e.g., a method) for using an LLM-based agent as a virtual network troubleshooting assistant, in accordance with one or more implementations described herein. For example, a non-generic, specifically configured device (e.g., device 200), such as a router, firewall, controller for a network (e.g., an SDN controller or other device in communication therewith), server, or the like, may perform procedure 700 by executing stored instructions (e.g., language model process 249 and/or network control process 248). The procedure 700 may start at step 705, and continues to step 710, where, as described in greater detail above, the device may perform, using a using a large language model-based troubleshooting agent, troubleshooting of a plurality of issues in a network indicated by a plurality of support tickets opened by users of the network. In some implementations, the large language model-based troubleshooting agent is configured to perform corrective actions in the network for an issue indicated by a particular support ticket. In one implementation, the results of the troubleshooting indicate an action to be performed by the users and the device may send a notification to the users to perform the action. In some cases, the device performs the troubleshooting of the plurality of issues using the large language model-based troubleshooting agent, in accordance with a policy that controls which types of issues the large language model-based troubleshooting agent is allowed to troubleshoot. In further cases, the device performs the troubleshooting in accordance with a policy that controls a maximum number of tokens that the large language model-based troubleshooting agent is allowed to pass to a large language model to troubleshoot a particular issue. In one case, the results of the troubleshooting indicate that the large language model-based troubleshooting agent was unable to identify a root cause of the plurality of issues. In another instance, the large language model-based troubleshooting agent generates the results of the troubleshooting based in part on a database of previously resolved support tickets.

At step 715, as detailed above, the device may aggregate, based on results of the troubleshooting, the plurality of support tickets into a master support ticket. In some implementations, the device may do so by aggregating the plurality of support tickets into the master support ticket by applying clustering to the plurality of support tickets. In one implementation, the results of the troubleshooting indicate a common element or elements in the network associated with the plurality of issues. In some cases, the device aggregates the plurality of support tickets based on a configured maximum number of issues per master support ticket.

At step 720, the device may obtain a resolution to the master support ticket from a support engineer, as described in greater detail above. For instance, the support engineer may specify the steps to perform (either by a user or in an automated manner) troubleshooting of the master issue and, in some instances, to correct the master issue, as well.

At step 725, as detailed above, the device uses the resolution to the master support ticket in conjunction with the large language model-based troubleshooting agent to troubleshoot a new support ticket. For instance, the device may store the resolution to the master ticket in a database that the agent searches when troubleshooting the new support ticket.

Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for an LLM-based agent as a virtual network troubleshooting assistant, it is to be understood that various other adaptations and modifications may be made within the spirit and scope of the implementations herein. For example, while certain implementations are described herein with respect to using certain models for purposes of generating CLI commands, making API calls, charting a network, and the like, the models are not limited as such and may be used for other types of predictions, in other implementations. In addition, while certain protocols are shown, other suitable protocols may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method comprising:
    performing, by a device and using a large language model-based troubleshooting agent, troubleshooting of a plurality of issues in a network indicated by a plurality of support tickets opened by users of the network, wherein the device structures troubleshooting requests to a large language model in accordance with a policy that constrains resources allocated to a large language model-based troubleshooting agent's troubleshooting requests to the large language model;
    aggregating, by the device and based on results of the troubleshooting, the plurality of support tickets into a master support ticket;
    obtaining, by the device, a resolution to the master support ticket from a support engineer; and
    using, by the device, the resolution to the master support ticket in conjunction with the large language model-based troubleshooting agent to troubleshoot a new support ticket.

2. The method as in claim 1, wherein the large language model-based troubleshooting agent is configured to perform corrective actions in the network for an issue indicated by a particular support ticket.

3. The method as in claim 1, wherein the results of the troubleshooting indicate an action to be performed by the users, and wherein the method further comprises:
    sending a notification to the users to perform the action.

4. The method as in claim 1, wherein the device aggregates the plurality of support tickets into the master support ticket by applying clustering to the plurality of support tickets.

5. The method as in claim 1, wherein the results of the troubleshooting indicate a common element or elements in the network associated with the plurality of issues.

6. The method as in claim 1, wherein the device performs the troubleshooting of the plurality of issues using the large language model-based troubleshooting agent, in accordance with a policy that controls which types of issues the large language model-based troubleshooting agent is allowed to troubleshoot.

7. The method as in claim 1, wherein the policy controls a maximum number of tokens that the large language model-based troubleshooting agent is allowed to pass to the large language model to troubleshoot a particular issue.

8. The method as in claim 1, wherein the results of the troubleshooting indicate that the large language model-based troubleshooting agent was unable to identify a root cause of the plurality of issues.

9. The method as in claim 1, wherein the large language model-based troubleshooting agent generates the results of the troubleshooting based in part on a database of previously resolved support tickets.

10. The method as in claim 1, wherein the device aggregates the plurality of support tickets based on a configured maximum number of issues per master support ticket.

11. An apparatus, comprising:
    one or more network interfaces;
    a processor coupled to the one or more network interfaces and configured to execute one or more processes; and
    a memory configured to store a process that is executable by the processor, the process when executed configured to:
        perform, using a large language model-based troubleshooting agent, troubleshooting of a plurality of issues in a network indicated by a plurality of support tickets opened by users of the network, wherein the device structures troubleshooting requests to a large language model in accordance with a policy that constrains resources allocated to a large language model-based troubleshooting agent's troubleshooting requests to the large language model;

aggregate, based on results of the troubleshooting, the plurality of support tickets into a master support ticket;

obtain a resolution to the master support ticket from a support engineer; and use the resolution to the master support ticket in conjunction with the large language model-based troubleshooting agent to troubleshoot a new support ticket.

12. The apparatus as in claim 11, wherein the large language model-based troubleshooting agent is configured to perform corrective actions in the network for an issue indicated by a particular support ticket.

13. The apparatus as in claim 11, wherein the results of the troubleshooting indicate an action to be performed by the users, and wherein the process when executed is further configured to:

send a notification to the users to perform the action.

14. The apparatus as in claim 11, wherein the apparatus aggregates the plurality of support tickets into the master support ticket by applying clustering to the plurality of support tickets.

15. The apparatus as in claim 11, wherein the results of the troubleshooting indicate a common element or elements in the network associated with the plurality of issues.

16. The apparatus as in claim 11, wherein the apparatus performs the troubleshooting of the plurality of issues using the large language model-based troubleshooting agent, in accordance with a policy that controls which types of issues the large language model-based troubleshooting agent is allowed to troubleshoot.

17. The apparatus as in claim 11, wherein the policy controls a maximum number of tokens that the large language model-based troubleshooting agent is allowed to pass to the large language model to troubleshoot a particular issue.

18. The apparatus as in claim 11, wherein the results of the troubleshooting indicate that the large language model-based troubleshooting agent was unable to identify a root cause of the plurality of issues.

19. The apparatus as in claim 11, wherein the large language model-based troubleshooting agent generates the results of the troubleshooting based in part on a database of previously resolved support tickets.

20. A tangible, non-transitory, computer-readable medium storing program instructions that cause a device to execute a process comprising:

performing, by the device and using a large language model-based troubleshooting agent, troubleshooting of a plurality of issues in a network indicated by a plurality of support tickets opened by users of the network, wherein the device structures troubleshooting requests to a large language model in accordance with a policy that constrains resources allocated to a large language model-based troubleshooting agent's troubleshooting requests to the large language model;

aggregating, by the device and based on results of the troubleshooting, the plurality of support tickets into a master support ticket;

obtaining, by the device, a resolution to the master support ticket from a support engineer; and using, by the device, the resolution to the master support ticket in conjunction with the large language model-based troubleshooting agent to troubleshoot a new support ticket.

* * * * *